June 20, 1939.  D. E. JOHNSON  2,162,891

SCREW AND METHOD OF MAKING SAME

Filed Feb. 18, 1938  3 Sheets-Sheet 1

INVENTOR
David E. Johnson
By Parker, Carlson, Pitzner & Hubbard
ATTORNEYS

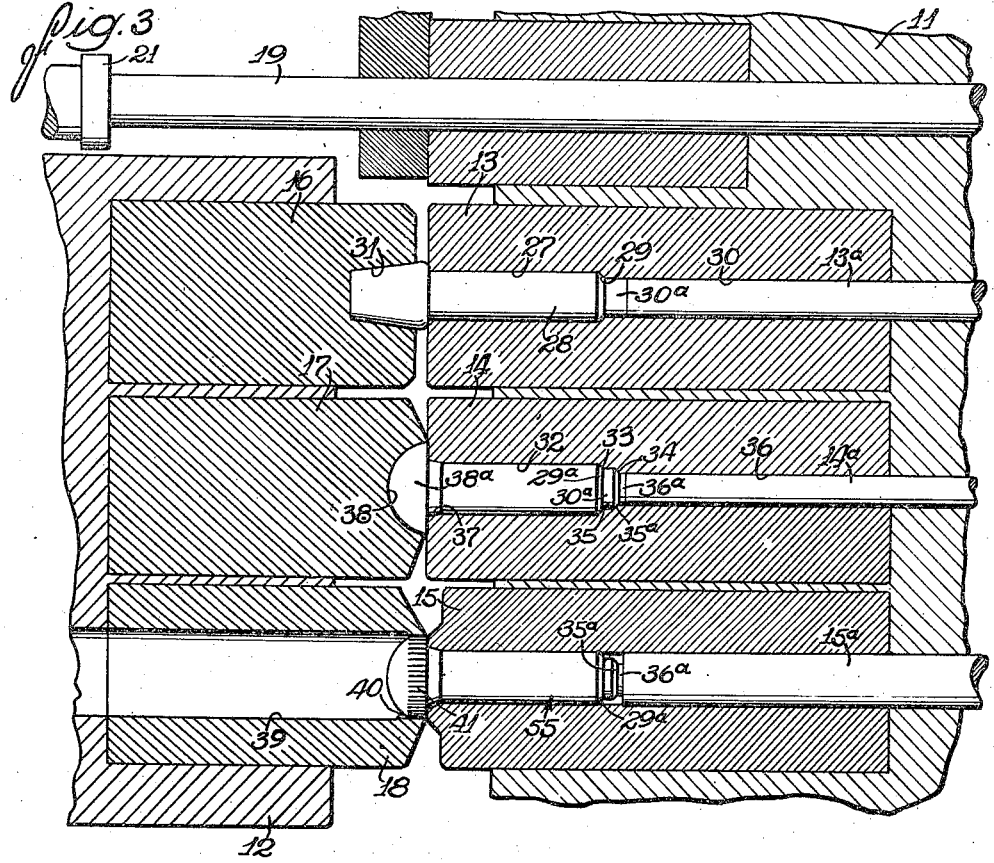
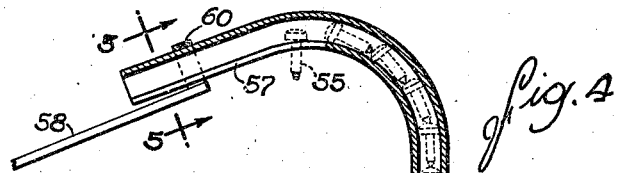
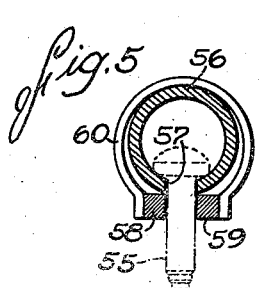
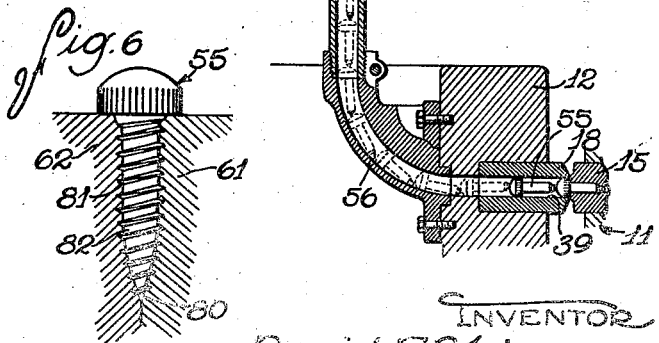

June 20, 1939.  D. E. JOHNSON  2,162,891
SCREW AND METHOD OF MAKING THE SAME
Filed Feb. 18, 1938  3 Sheets-Sheet 3
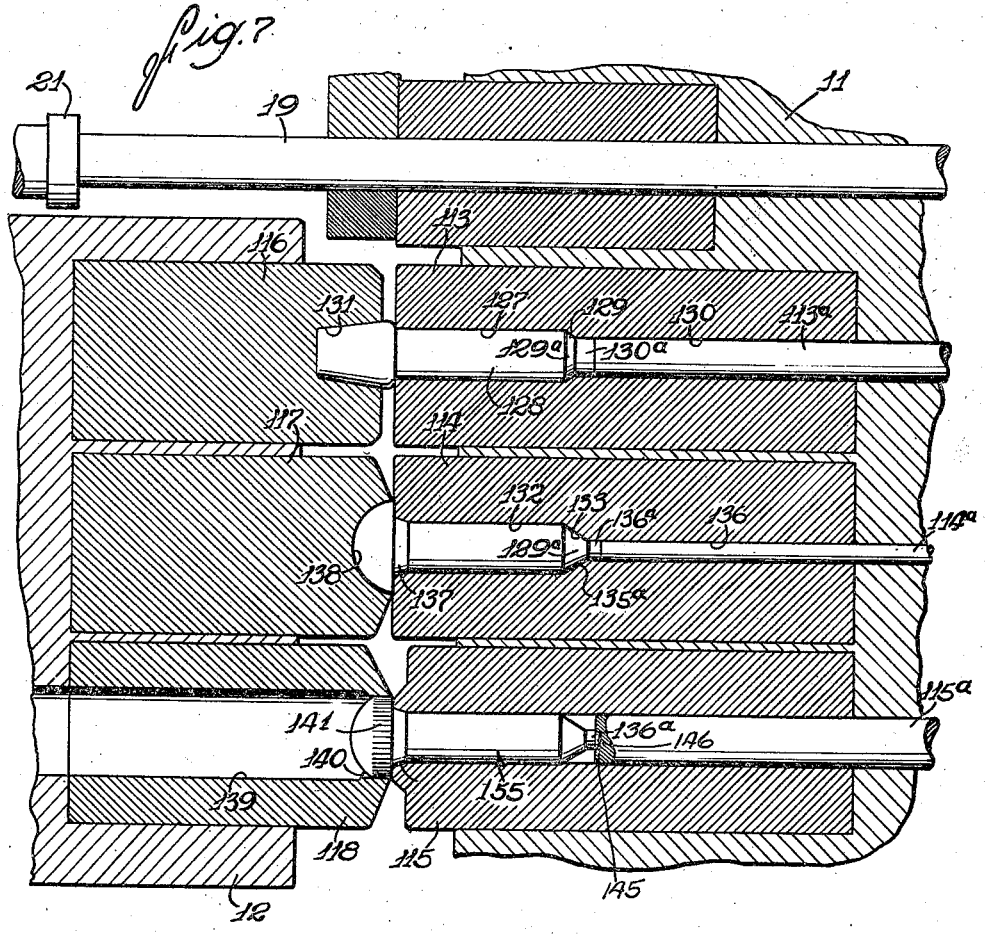

Patented June 20, 1939

2,162,891

UNITED STATES PATENT OFFICE 2,162,891

SCREW AND METHOD OF MAKING SAME

David E. Johnson, Rockford, Ill.

Application February 18, 1938, Serial No. 191,151

12 Claims. (Cl. 10—10)

My invention relates to screws and blanks therefor, and more particularly to blanks for gimlet points screws, as well as to a method for manufacturing the same.

Wood and so-called sheet metal screws are provided with a tapered or gimlet point having a thread thereon, the pitch diameter of which decreases progressively to the screw tip. In making such screws, it has heretofore been proposed to forge a head on one end of a blank, to remove metal from the other end to form a conical point, and then to roll the threads thereon. When such operations are carried out in separate machines, the process of manufacture is comparatively slow because of the necessary handling of the blanks between operations. Although automatic combined blank forming and threading machines, such as that shown in the patent to Earl R. Frost, No. 2,020,658, have heretofore been successfully used to form blanks in large quantities for various types of screws and bolts and to thread the same, all in the same machine, it has not been possible to use such a machine efficiently in making gimlet point screws. This is because the amount of metal which must be removed in order to form a point of the required shape is comparatively large and, as a consequence, the operation requires so much time for each blank that the speed of the heading, trimming and threading mechanisms must be reduced substantially below their normal operating speeds in order to maintain the proper timed relation between the various operations which are sequentially performed. In addition, the cutting tool used for pointing becomes dulled requiring frequent shut-down of the machine for replacement thereof. It will thus be seen that the operation of a machine of this type is very slow and inefficient when used for making gimlet point screws as compared to what may be termed its normal operation in making bolts, machine screws, cap screws and the like.

One object of the present invention is to provide a novel method of pointing screw blanks which enables gimlet point screws to be formed in a combined heading, point and roll threading machine of the above character without limiting the production capacity of the machine.

In carrying out this object, the invention contemplates formation, in one or more forging operations, of a novel point construction upon which gimlet point threads may be rolled.

Another object is to provide for forging the point on one end of the screw blank while the head forming operations are being performed on the other end.

A further object of my invention is to provide a gimlet point screw blank having a point of new and improved construction.

Further objects and advantages of my invention will become apparent as the following description proceeds and the features of novelty, which characterize my invention, are pointed out with particularity in the claims annexed to and forming a part of this specification.

For a better understanding of my invention, reference may be had to the accompanying drawings, in which:

Fig. 3 is an enlarged sectional view along the line 3—3 of Fig. 2.

Fig. 4 is a detail view partly in section of the mechanism used for transferring blanks from the forming dies to the roll threading dies.

Fig. 5 is an enlarged sectional view along the line 5—5 in Fig. 4.

Fig. 6 is a cross-sectional view of the roll threading dies illustrating the manner of finishing a gimlet point screw.

Fig. 7 is an enlarged sectional view similar to Fig. 3 and illustrating a modified form of die mechanism.

Figure 1:
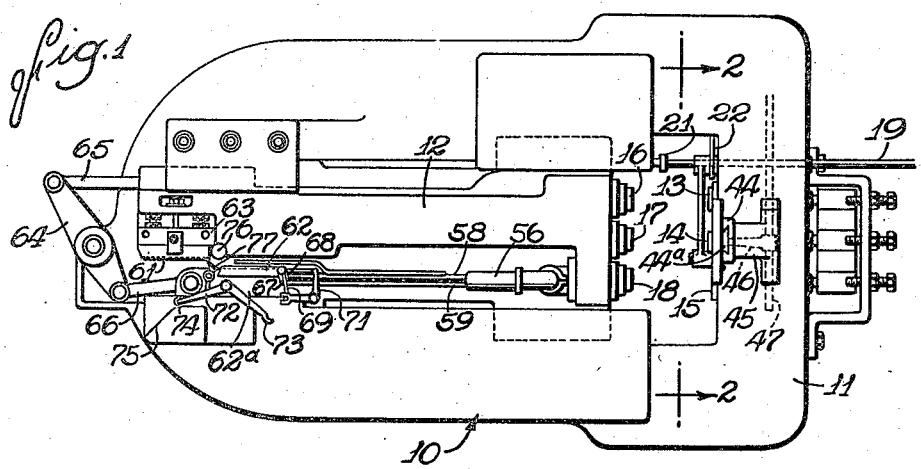
Figure 1 is a top plan view of a unitary screw blank forming and threading machine for carrying out my invention.

In accordance with my improved method, blanks for gimlet point screws are made from lengths of wire stock preferably having a diameter substantially equal to the body portion or stem of the finished screws. As herein illustrated, the improved method of pointing the blanks preparatory to rolling a gimlet point thread thereon comprises forcing one end portion of the blank into a die recess shaped to form a short protrusion of reduced cross-section on the end of the blank. Then this reduced end portion is further reduced in diameter by forcing it into a second and smaller drawing die. A generally tapered end or "point" is thus formed which so closely simulates the shape of the conical point ordinarily used that a perfect gimlet point thread of progressively decreasing diameter may be formed on the blank in a roll threading operation. The drawing operations by which the blank is pointed are preferably carried out simultaneously with the forging operations in which the opposite end of the length of stock is upset and shaped by suitable dies to form a screw head.

In the drawings, the invention is illustrated in conjunction with a combined heading, trimming and roll threading machine similar in its general construction and arrangement of parts to that shown in Patent No. 2,020,658 to which reference may be had for details of construction and operation. My machine differs in one important respect from the one shown in this patent, however, in that the screw blanks are pointed by forging of the metal comprising one end of the blanks rather than by a metal removing operation as is the case in the machine shown in said patent. As a consequence, my machine may be operated with great rapidity and efficiency to form blanks for gimlet point screws.

Referring first to Fig. 1, the combined heading and threading machine there shown includes a bed frame 10 of heavy and rigid construction having one end of its upper side formed in the usual manner as a U-shaped die breast 11. A header slide or ram 12 is mounted in horizontal guideways to reciprocate longitudinally of the frame toward and away from the die breast 11. The header 12 may be reciprocated by a suitable driving mechanism (not shown) housed in the supporting frame 10. In the particular machine illustrated, three sets of blank supporting dies 13, 14 and 15 and cooperating punches 16, 17 and 18, carried by the die breast 11 and header 12, respectively, operate successively on lengths of wire stock supported in the dies. The headed and pointed blanks are carried by a transfer mechanism to a pair of reciprocating roll threading dies, hereinafter described, which form threads on the blanks.

A wire 19 is fed from a reel or other source of supply into the machine by any suitable type of feeding mechanism. As the stock is fed through the bed frame 10, it engages an adjustable abutment 21. A cut-off arm 22 is arranged to engage the stock, shear off blanks of desired length and carry the same into alinement with the first die 13. The arm 22 is pivoted at 23 (Fig. 2) on the frame 10 and is operated by a cam 24 engaging a roller 25 carried by a lateral extension on the arm 22. The cam 24 is on a cam shaft 26 which is, in turn, driven in timed relation with the reciprocations of the header slide 12. During each cycle of operation of the machine, the arm 22 is rocked by the cam 24 to shear off a blank and carry the same into alinement with the die 13 during the time the header slide 12 is retracted and then to return to its initial position to receive another blank while the header slide is moved forward into engagement with the work. The cut-off mechanism may be of the well known type disclosed in the patent to William L. Clouse No. 1,856,028, issued April 26, 1932, and consequently need not be described here in further detail.

Upon reference to Fig. 3, it will be seen that the die 13 is provided with a bore 27 communicating with the face of the die, which is substantially equal in length to the body portion proper or stem of a screw blank 28 positioned therein. The diameter of the bore 27 is also substantially equal to the diameter of the stock 19. The bore 27 terminates in a bevel-faced throat 29 which merges with a second bore 30 of smaller diameter. The horizontally reciprocating punch 16, which cooperates with the die 13, is provided with a frusto-conical recess or die cavity 31 in the front face thereof. Consequently, when a length of stock is positioned between the punch 16 and die 13, the punch forces the length of stock into the bore 27 so that one end of the stock is forced axially through the throat 29 and into the bore 30 to extrude a protrusion of reduced cross-section on the end of the blank in the form of a cylindrical end portion 30$^a$ of reduced diameter terminating in a beveled face or section 29$^a$. At the same time, the other end of the length of stock is upset and given a substantially frusto-conical shape as shown in Fig. 3.

The second die 14 is also provided with a longitudinal bore 32 of substantially the same dimensions as the bore 27 in the die 13 and terminating in a bevel-faced throat 33 similar in size and shape to the throat 29. The die 14 is also provided with a second bevel-faced throat 34 of smaller diameter than the throat 33, the two throats being connected by a relatively short cylindrical bore 35 of substantially the same diameter as the bore 30 in the die 13. The throat 34 terminates in a bore 36 of still smaller diameter. It will be noted that the edges of the bore 32 at the open end of the die recess are beveled, as indicated at 37, in order to slightly enlarge the diameter of the stem of the screw at the base of its head. The punch 17, which cooperates with the die 14, is provided with a spherical recess or die cavity 38 which serves to shape the upset end of the length of stock. It will thus be seen that when a blank is transferred from the die 13 to the die 14, the punch 17 will force the same into the bore 32 so that the reduced end portion 30$^a$ thereof is moved axially for a part of its length through the throat 34 to form the reduced end portion 36$^a$ and beveled section 35$^a$ between the portions 30$^a$ and 36$^a$. In the same operation, the upset end is forged by the punch 17 to give the desired shape to the head 38$^a$. A plurality of relatively short stepped portions of successively smaller diameter than the body portion of the stock are thus formed on one end of the blank giving the same a generally pointed contour and a flat end as is required. The relative lengths of the cylindrical portions 35$^a$ and 36$^a$ are such that ends of these portions and the end of the stem 28 proper constitute elements of a cone of the shape desired for producing the desired taper on the finished screw when the latter is roll threaded.

The die 15 is simply a holding die which maintains the blank in position to be operated upon by the punch 18, which in the machine illustrated constitutes a trimming die. A longitudinally extending bore 39 is formed in the punch 18 and a series of inwardly extending cutting teeth 40 are provided at the outer end of this bore. These teeth serve to cut serrations 41 on the periphery of the head of the screw blank. These serrations, which serve the same general purpose as the slot formed in ordinary wood screws, may be engaged by a suitable socket headed driving tool when the finished screws are used. Of course, any other desired type of head may be formed.

Figure 2:
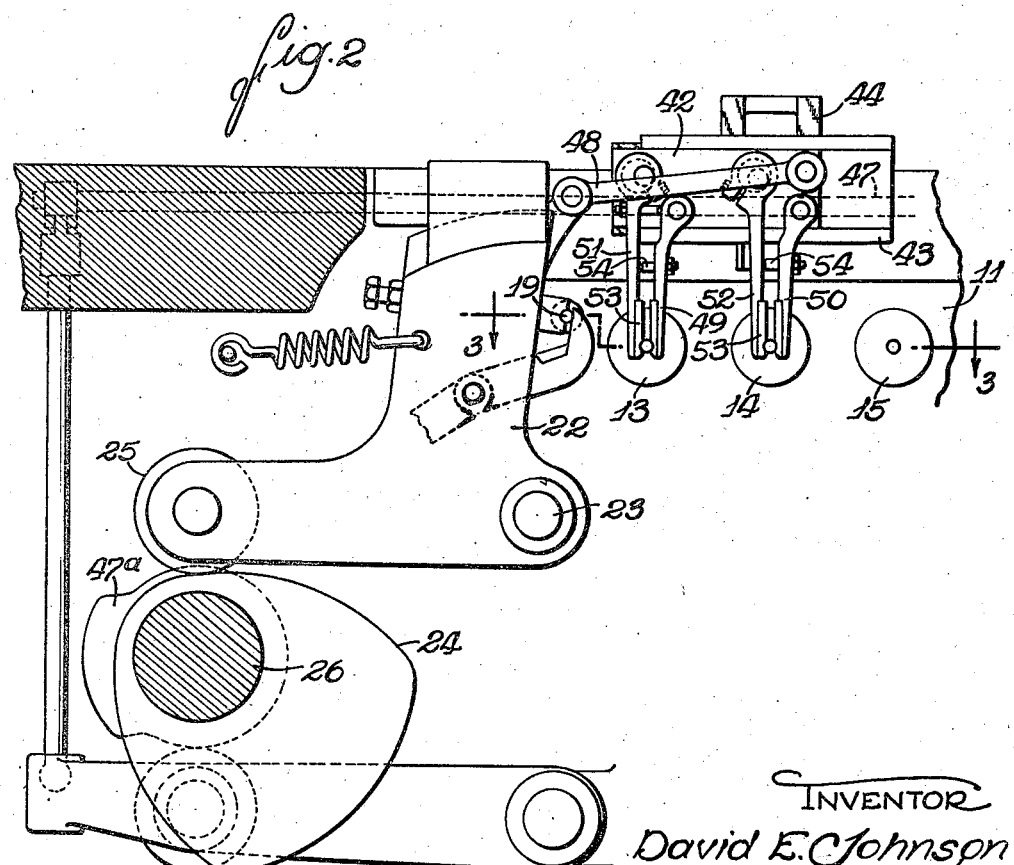
Fig. 2 is an enlarged elevational view partly in section taken along the line 2—2 of Fig. 1 showing the blank supporting dies and the cut-off and transfer mechanisms.

The lengths of stock severed from the wire 19 are moved successively from the die 13 to the die 14 and then from the die 14 to the die 15 by transfer mechanism operating in timed sequence with the movement of the header slide 12. As shown in Fig. 2, this transfer mechanism includes a plate 42 which is slidably mounted in horizontal guides 43. The latter are, in turn, mounted on a slide 44$^a$ (Fig. 1) which is adapted to reciprocate vertically along guides 44. A horizontally disposed hollow bracket 45 supports the vertical guides 44.

Vertical reciprocatory movement is imparted to the horizontal guides 43 and plate 42 mounted thereon by an arm 46 (Fig. 1) rigidly secured to a horizontally extending shaft 47. Through a suitable driving connection the rock shaft 47 is oscillated by a cam 47a (Fig. 2) in timed relation with respect to the header slide 12. Horizontal reciprocatory movement of the plate 42 with respect to the horizontal guides 43 is imparted thereto by a link 48 pivotally connected at its opposite ends to the oscillating arm 22 and to the plate 42.

The plate 42 is provided with two pairs of fingers adapted to engage successive screw blanks upon downward movement of the plate 42. Then upon the horizontal movement of the plate 42 these fingers carry the screw blanks into alinement with the next successive dies. In the particular arrangement shown in Fig. 2, a pair of depending arms 49 and 50 are fast on the plate 42. The arm 49 is arranged so that its inner face is flush with the opening in the die 13 when the arm 22 is at one end of its stroke, and flush with the opening in the die 14 when the arm is at the other end of its stroke. The arm 50 is similarly arranged with respect to the openings in the dies 14 and 15.

A pair of pivoted arms 51 and 52 cooperate with the arms 49 and 50 respectively. Each arm 51 and 52 carries at its lower end a hardened wear plate 53 having a recess adapted to receive and hold a screw blank. Each of the arms 51 and 52 is secured by set screws to an eccentric on a stud rotatably mounted in the plate 42 so that the set screws may be loosened and the stud rotated to adjust the vertical position of the arm and aline the holding recess with the adjacent die openings. An adjustable spring tension member 54 normally holds each arm 51 and 52 pressed toward its cooperating arm 49 and 50 respectively. The blank holding recesses in the wear plates 53 permit the arms to be pressed apart and snap away from a blank when withdrawn therefrom.

Each of the dies 13, 14 and 15 is provided with reciprocatory ejectors 13a, 14a and 15a (Fig. 3) respectively, which are slidably mounted in the longitudinal bores formed in the dies. These ejectors are moved in timed sequence with respect to the movement of the transfer mechanism by a suitable driving arrangement to move the blanks out of the dies into a position to be grasped by the fingers of the transfer mechanism.

It will thus be seen that in the operation of the machine described, successive lengths of stock severed from the wire 19 are moved progressively to the dies 13, 14 and 15. These dies and their cooperating punches successively shape or forge the lengths of stock until a finished blank, such as the blank 55 shown in Fig. 3 is formed. This blank has a suitably shaped and trimmed head and a stepped end or point adapted to have a thread of decreasing pitch diameter rolled thereon. Thus, while the stepped point construction is not of truly frusto-conical shape, it does approximate such shape so closely that the metal of the point will flow properly under the action of the roll threading dies and enable a perfect gimlet point thread to be formed.

The finished blank is moved by the ejector 15a out of the die 15 into the recess of the trimming die 18 where the blank will be retained as the header slide is retracted. Then, as the punch 18 again moves forwardly in the next cycle, the reduced end of the blank 55 strikes against the head of the next successive blank presented to the opening in the die 15 by the transfer mechanism so that the blank 55 will be advanced longitudinally along the bore 39 in the punch 18.

As shown in Fig. 4, a tubular conduit 56 is mounted on the header slide 12 in communication with the rear end of the bore 39 so as to receive the finished blanks 55 from the latter. The tube 56 curves upwardly to elevate the blanks and has a downwardly extending portion formed in its lower side with a slot 57 which permits the stems of the finished blanks to pass therethrough while the heads are retained in the tube. Thus, the stems of the blank hang downwardly (Figs. 4 and 5).

Before the blanks are discharged from the tube, their stems pass between inclined guide rails 58 and 59 (Fig. 5) which, in the present instance, are slidably and pivotally connected to the tube 56 by a yoke 60 thereby allowing for independent reciprocation of the header slide. The blanks slide down along the rails 58 and 59 and are delivered to a pair of reciprocating roll threading dies 61 and 62 (Fig. 1) and threaded in a manner well understood in the art.

The die 61 is secured to the rear end portion of the reciprocating header slide 12 by a suitable die holder 63 and is thus reciprocated by movement of the header slide. The cooperating roll threading die 62 is mounted for horizontal reciprocatory movement on the base frame 10 by a suitable die holder 62a and guiding arrangement. Movement is imparted thereto by a linkage mechanism including a walking beam 64 pivotally mounted on the supporting frame 10 and pivotally connected at its opposite ends to the header slide 12 and to the die holder 62a by links 65 and 66 respectively.

Beyond the end of the rail 58, the rail 59 is provided with a lateral extension 67 forming an abutment at the end of the track. The rail 58 terminates short of the extension 67 thus leaving a passage therebetween of the same size as the passage between the rails 58 and 59. A pair of track members 68 are mounted on the holder 62a of the roll threading die 62 and register with the ends of the rails 58 and 59 when the die 62 is at one extremity of its path of movement.

A pusher 69 is arranged to push screw blanks 55 from the tracks 58 and 59 into a position between the members 68 when the holder 62a reaches the end of its forward stroke. The pusher 69 is actuated by a bell crank lever 71 pivotally mounted on the base frame 10. One arm of the bell crank lever 71 loosely engages the end of the pusher 69 and the other end is arranged for engagement with the end of the die support 62a. A suitable spring arrangement is provided for retracting the bell crank lever 71 upon disengagement thereof by the die support 62a.

A bell crank lever 72 is arranged to force the screw blanks 55 out of position between the members 68 and into position between the roll threading dies 61 and 62 when the holder 62a reaches the end of its rearward movement. This lever 72 is pivoted on the die holder 62a and has a hooked end 73 riding over the top of the members 68 to engage the head of a screw blank 55 positioned between the latter. The opposite end of the bell crank lever 72 is provided with a roller 74 riding on a peripheral cam 75 rigidly secured to the base frame 10. The lever 72 is spring biased into engagement with the cam 75 so that, as the holder 62a moves rearwardly, the bell crank lever 72 is rocked in a counterclockwise direction as viewed in Fig. 1, bringing the hooked end 73 into engagement with a screw blank 55 positioned between the member 68. As the holder 62ª reaches the end of its rearward movement, the contour of the cam 75 allows the end 73 of the bell crank lever to force the blank out from between the members 68 and into position between the roll threading dies 61 and 62. The space between the dies is just sufficient to accommodate the stem of the screw so that the under surface of the head rides on the top surfaces of the dies. When the holder 62ª returns to its forward position, the cam 75 forces the hook 73 out of the path of movement of the blanks moving into the supporting members 68.

The roll threading dies 61 and 62 are properly shaped to form a gimlet point thread 80 (Fig. 6) of decreasing pitch diameter on the reduced end portion of the blank, which is a continuation of the thread 81 also formed by the roll threading dies on the stem or body portion 82 of the blank. A finished gimlet point screw, such as that shown in Fig. 6, is thus produced. The finished screws are ejected from between the dies 61 and 62 upon the termination of their roll threading movement into an opening 76 (Fig. 1) in the base frame 10, which communicates with a receptacle in which they are received. An oscillating finger 77, pivotally mounted on the holder 62ª, is normally held out of contact with the blanks between the dies 61 and 62 and a stop pin is arranged to engage the finger 77 to move it into position to eject the finished screws from between the dies upon the completion of their roll threading movement. The details of construction and operation of the roll threading dies, and the operating mechanism, therefore need not be described here in further detail since such dies and mechanism are well known in the art. The operating mechanism illustrated in substantially the same as that shown in Patent No. 2,020,658 previously referred to.

Instead of separating the frusto-conical or beveled portions 29ª and 35ª by the intervening cylindrical step 30ª, the latter step may, if desired, be eliminated entirely or substantially so that the two portions merge and form a single longer beveled portion indicated at 135ª in Fig. 7 in the double extruding operation above described. In such a case, the end step would be elongated somewhat as indicated at 136ª.

Forging of the metal stock into this modified shape may be accomplished by punches and dies of the form shown in Fig. 7. The three sets of dies and cooperating punches of Fig. 7 are intended for use in a machine like that of Figs. 1 and 2 and accordingly corresponding parts have been designated in Fig. 7 by reference numerals which are 100 greater than the reference numerals used for like parts in Fig. 3. For example, the main die 113 of Fig. 7 corresponds to die 13 in Fig. 3 and the cooperating punch 116 corresponds to the punch 16 in Fig. 3. The cooperating dies and punches in Fig. 7 are designed to shape the stock by a double extrusion process, that is, by successive extrusions or forgings of one end of the blank, the second extrusion or forging operation serving to elongate the beveled face and the cylindrical portion.

A longitudinal bore 127 in the die 113 receives the blank 128 severed from the stock 19 and is of a diameter substantially equal to the initial diameter of the stock. This bore 127 terminates in a bevel-faced throat 129, which merges with a second bore 130 of smaller diameter or cross section. The horizontally reciprocating punch 116, which cooperates with the die 113, is provided with a frusto-conical recess or die cavity 131 in the front face thereof. Consequently, when a length of stock is positioned between the punch 116 and die 113, the punch forces the length of stock into the bore 127 so that one end of the stock is extruded through the throat 129 and into the bore 130 to form a cylindrical end portion 130ª of reduced diameter and a beveled section 129ª. At this point, the end of the blank is reduced to a shape similar to the shape produced by the die 13 previously described.

The blank forged by the punch and die 116—113 is ejected by a plunger 113ª and then transferred to the second die 114. This die cooperates with a punch 117 and is provided with a longitudinal bore 132 of substantially the same dimensions as the bore 127 in the die 113, and terminating in a bevel-faced throat 133. The throat 133 is substantially longer than the throat 129 and merges into a bore 134 which is also of substantially smaller diameter than the bore 130. As the punch 117 advances the blank into the die 114, the inner end of the blank is extruded into the throat 133 and at the same time the head is shaped by a spherical die recess 138 in the face of the punch and a frusto-conical portion 137 is shaped on the shank immediately below the head. By this operation the protrusion 130ª, formed on the end of the blank by the die 113, is elongated to form a frusto-conical extension of the previously formed beveled-face 129ª, and a small cylindrical extension 136ª. Upon the completion of this second forging operation, the blank is ejected from the die by a plunger 114ª.

The third die 115, like the die 15, is simply a holding die which maintains the blank in position to be operated upon by a cooperating punch 118, shown as a trimming die and identical in construction with the punch 18 (Fig. 3). A longitudinally extending bore 139 formed in the punch 118 receives the finished blanks 155 as they are ejected from the die 115 by a plunger 115ª. Serrations 141 on the head of the blank are cut by die teeth 140 on the punch 118 thereby trimming and finishing the head of the blank. The serrations also serve to accommodate the screw head for engagement by a cooperating driving tool. It is apparent that the operations performed correspond in general with those previously described for the mechanism shown in Fig. 3.

Preferably, though not necessarily, the active end of the ejector plunger 115ª is formed with a cup-shaped recess 145 correlated in size with the end portion 136ª of the blank. Under the impact applied to the end portion 136ª as the blank is struck by the plunger and forced through the trimming die, the inclined walls of the recess 145 engage the squared edge of the portion 136ª and bevel the edge slightly as indicated at 146 (Fig. 7), thereby further reducing the end of the blank to a shape simulating a true cone.

It will thus be seen that I have provided a method of forming gimlet point screws in which a suitably pointed blank is provided without the necessity of employing any metal removing operations and without wasting any metal and in which dishing of the reduced ends is avoided. In addition, my improved method may be carried out with sufficient rapidity and efficiency that the blanks may be headed and completely formed in a minimum number of operations and with a minimum amount of handling. The improved combined blank forming and roll threading machine, which I have disclosed herein, is entirely automatic in its operation and serves to produce accurately machined and finished gimlet point screws from raw stock speedily and efficiently.

Although I have shown certain particular embodiments of my invention, which have been described in detail for purposes of illustration, I do not desire my invention to be limited to the particular constructions shown and described, and I intend in the appended claims to cover all modifications and alternative methods or devices within the spirit and scope of my invention.

The present application is a continuation in part of my copending application Serial No. 73,991 filed April 13, 1936.

I claim as my invention:

1. The method of making gimlet point screws which comprises upsetting one end of a length of stock to form the head portion of the same and in the same operation extruding the other end portion to form the same in a generally beveled shape, shaping said upset head portion and in the same operation further extruding said other end portion to increase the length of the reduced section, and rolling a continuous thread on the stock extending from said other end thereof along the beveled portion and along at least a part of the intermediate portion of the stock.

2. The method of making a gimlet point screw which comprises progressively reducing the cross section of a length of stock to a generally tapered form by a plurality of successive extrusion operations, and rolling a continuous thread on the stock extending from said one end thereof along said extruded portion and along at least a part of the adjacent portion of the stock.

3. The method of making gimlet point screws which comprises upsetting one end of a length of stock to form the head portion of the same and in the same operation reducing the cross-section of the other end of the stock to form a short end portion of reduced cross-section and an elongated portion intermediate said head and end portion, and forming along both of said portions a continuous thread of a pitch diameter which decreases along said end portion to define a gimlet point thereon.

4. The method of forming a gimlet point screw which comprises upsetting one end of a length of wire stock to form a head and a cylindrical stem, drawing out a short length of the end of said stem to form a portion of reduced cross-section corresponding in length to the length of the tapered portion of the gimlet point thread to be formed, and rolling a gimlet point thread on said reduced portion and at least a part of said stem.

5. The method of making gimlet point screws which comprises upsetting one end of a length of stock to form the head portion of the same and in the same operation reducing the diameter of the other end portion of the stock to form a reduced end portion thereon, shaping said upset head portion and in the same operation further reducing the diameter of said reduced end portion for a part of its length, and forming a continuous thread on the stock extending along the reduced end portions.

6. The method of making gimlet point screws which comprises upsetting one end of a length of stock to form the head portion of the same and in the same operation reducing the diameter of the other end portion of the stock to form a reduced end portion thereon, shaping said upset head portion and in the same operation further reducing the diameter of said reduced end portion for a part of its length, and rolling a continuous thread on the stock extending along the reduced portions and along at least a part of the stock between the head and reduced portions.

7. The method of making gimlet point screws which comprises reducing the diameter of one end of a blank to form a reduced cylindrical end portion of smaller diameter than the body portion of the blank, reducing the diameter of said reduced end portion for a part of its length to form a second reduced cylindrical end portion of smaller diameter than the first named end portion thereby giving the end of the blank a generally pointed contour on which a gimlet point thread may be rolled, and rolling a continuous thread from one reduced portion to another.

8. The method of making blanks for gimlet point screws which comprises the successive head forming operations of upsetting one end of a length of stock and shaping a head from the upset end of the stock, and pointing the other end of the stock by forging said other end of the stock simultaneously with said head forming operations to form a plurality of relatively short stepped cylindrical portions of successively smaller diameter than the body portion of the stock and beveled portions between the adjacent cylindrical portions of different diameters.

9. The method of making a gimlet point screw which comprises upsetting one end of a length of stock to form the head portion of the same and in the same operation extruding the other end portion of the stock to form a protrusion thereon of reduced diameter joined to the body of the stock by a beveled-faced section, shaping said upset head portion and in the same operation further extruding said other end portion to further reduce the diameter of said protrusion and lengthen said beveled-face section, and rolling a continuous thread on said stock extending from said other end thereof along at least a part of the adjacent portion of the stock.

10. As an article of manufacture, a gimlet point screw blank having a cylindrical stem adapted to have threads rolled thereon, a head formed at one end of said stem, a plurality of relatively short stepped portions at the other end of the stem having successively smaller diameters and forming a point adapted to have a thread of decreasing pitch diameter rolled thereon to form a gimlet point.

11. As an article of manufacture, a gimlet point screw blank having a cylindrical stem and a pointed end comprising a short cylindrical portion of reduced diameter, a beveled surface between the stem and said cylindrical portion, a second cylindrical portion further reduced in diameter, and a second beveled surface between said cylindrical portions, the combined axial lengths of said portions and said surfaces being approximately equal to the tapered portion of the gimlet thread to be rolled on the blank.

12. As an article of manufacture, a gimlet point screw blank having a cylindrical stem and a pointed end comprising a short cylindrical portion of reduced diameter joined to the stem by a section having a beveled surface, the actual length of said pointed end being approximately equal to the tapered portion of the gimlet thread to be rolled thereon.

DAVID E. JOHNSON.